US006237034B1

(12) United States Patent
Fulford (10) Patent No.: US 6,237,034 B1
(45) Date of Patent: May 22, 2001

(54) METHOD AND SYSTEM FOR TRANSMITTING AND RECEIVING ALARM NOTIFICATIONS AND ACKNOWLEDGEMENTS WITHIN A TELECOMMUNICATIONS NETWORK

(75) Inventor: Fraser Fulford, Ottawa (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/963,629

(22) Filed: Nov. 4, 1997

(51) Int. Cl.⁷ .................................................. G06F 15/173
(52) U.S. Cl. .................... 709/224; 709/223; 709/202; 379/33; 379/34; 340/502; 340/506; 714/47; 714/48
(58) Field of Search ..................... 340/502, 506, 340/825.06, 825.16; 379/33, 34, 22, 32, 37; 395/180; 709/201, 202, 223, 224; 714/26–39, 48, 47

(56) References Cited

U.S. PATENT DOCUMENTS

| | | | | |
|---|---|---|---|---|
| 5,485,142 | * | 1/1996 | Stute et al. ............................. | 370/506 |
| 5,598,456 | * | 1/1997 | Feinberg ................................. | 379/42 |
| 5,696,486 | * | 12/1997 | Poliquin et al. ...................... | 340/506 |
| 5,764,955 | * | 6/1998 | Doolan .................................. | 709/223 |
| 5,796,633 | * | 8/1998 | Burgess et al. ...................... | 702/187 |
| 5,878,326 | * | 3/1999 | Benz et al. ........................... | 455/31.2 |
| 5,907,491 | * | 5/1999 | Canada et al. .................... | 364/468.15 |
| 5,939,980 | * | 8/1999 | Heitmann et al. .................... | 340/506 |
| 5,949,974 | * | 9/1999 | Ewing et al. .......................... | 709/202 |
| 6,006,019 | * | 12/1999 | Takei .................................... | 709/224 |
| 6,012,152 | * | 1/2000 | Douik et al. ........................... | 714/26 |
| 6,021,437 | * | 2/2000 | Chen et al. ........................... | 709/224 |
| 6,057,757 | * | 5/2000 | Arrowsmith et al. ............... | 340/506 |
| 6,070,244 | * | 5/2000 | Orchier et al. ........................ | 713/201 |
| 6,119,159 | * | 9/2000 | Tseng et al. ........................... | 709/224 |
| 6,122,664 | * | 9/2000 | Boukobza et al. .................... | 709/224 |
| 6,125,390 | * | 9/2000 | Touboul ................................. | 709/223 |
| 6,141,777 | * | 10/2000 | Cutrell et al. ........................... | 714/47 |

\* cited by examiner

*Primary Examiner*—Mehmet B. Geckil
*Assistant Examiner*—William C. Vaughn, Jr.

(57) ABSTRACT

A system and method for acknowledging alarms is provided in which alarm acknowledgement information is managed in a distributed fashion by all entities interested in the alarms. In the course of an alarm acknowledgement being transmitted from an entity which generated the alarm acknowledgement back to the source of the alarm, each intervening entity records the fact that the alarm has been acknowledged, and sends notifications of this fact to other entities. In this manner, a single acknowledgement is propagated to the entire system. There is no need for a non-volatile store recording alarm acknowledgement information because the information will be present at a large number of entities any one of which can be used to update the information in a temporarily failed entity.

21 Claims, 6 Drawing Sheets

METHOD AND SYSTEM FOR TRANSMITTING AND RECEIVING ALARM NOTIFICATIONS AND ACKNOWLEDGEMENTS WITHIN A TELECOMMUNICATIONS NETWORK

FIELD OF THE INVENTION

The invention relates to systems and methods for circulating alarm acknowledgement information.

BACKGROUND OF THE INVENTION

In a telecommunications network, an alarm is generated when some sort of anomalous condition arises in a component forming part of the network. Such an alarm is transmitted in message form through the network to network surveillance personnel (or "craftspeople") working at various network surveillance workstations or to a higher level management system.

Large networks can quickly overwhelm users with large amounts of alarm information. Accordingly, a mechanism is needed to allow the users of the system to track which alarms have already been looked at so that when a new alarm comes in it can be investigated as soon as is appropriately possible. This is referred to as alarm acknowledgement.

Various existing alarm acknowledgement schemes exist. In one scheme, when an alarm message is received by a network surveillance workstation, some text is highlighted on a screen. After a particular operator acknowledges the alarm, the highlighting is removed. A problem with this system is that the highlighting is only removed from the particular workstation at which the particular operator was working. Assuming the alarm message was sent to a number of such workstations, the other workstations will still show the alarm as being in an unacknowledged state.

In existing systems, alarm information is stored in one or more non-volatile repositories which might be disk drives for example. This is to provide an aspect of survivability. When a system fails, after recovery the information will still be in the non-volatile repository. A problem with this is that if the non-volatile repository or links to the non-volatile repository malfunction, then the alarm repository becomes unavailable to network operators. Furthermore, it is known that non-volatile storage mechanisms such as disk drives for example can be very slow. If many alarms are being generated in a short amount of time, disk access can become a bottleneck.

SUMMARY OF THE INVENTION

It is an object of the invention to obviate or mitigate one or more of the above identified disadvantages.

According to a first broad aspect, the invention provides in a network comprising at least one AGE (alarm generating entity) which generates alarms and a plurality of SME's (surveillance management entities) including a last SME in direct communication with the AGE, for each SME the direction of communication towards the AGE being defined as upstream for that SME and the direction of communication away from the AGE being defined as downstream for that SME, a method of acknowledging alarms comprising the steps of: a particular SME generating an alarm acknowledgement in response Into an alarm received from the AGE and passing this upstream; to each SME performing the steps of: in response to receiving an alarm acknowledgement: 1) recording the alarm acknowledgement; 2) forwarding the alarm acknowledgement upstream to a single SME in particular the one that sent the Alarm in the first place in the upstream direction or in the case of the SME being the last SME forwarding the alarm acknowledgement upstream to the AGE; 3) sending downstream to all SME's interested in the alarm an alarm notification that an alarm acknowledgement has been sent; in response to receiving an alarm notification: 4) determining whether the alarm notification is new; 5) recording the alarm notification if it is new and discarding the alarm notification if it is not new; and 6) if the alarm notification is new sending an alarm notification downstream to all SME's interested in the alarm.

According to a second broad aspect, the invention provides an SME (surveillance management entity) for use in a network comprising at least one AGE (alarm generating entity) which generates alarms and a plurality of such SME's including a last SME in direct communication with the AGE, for each SME the direction of communication towards the AGE being defined as upstream for that SME and the direction of communication away from the AGE being defined as downstream for that SME, the SME comprising: means for generating an alarm acknowledgement in response to an alarm received from the AGE and passing this upstream; means for receiving and recording an alarm acknowledgement; means for forwarding the alarm acknowledgement upstream to a single SME in the upstream direction or in the case of the SME being the last SME forwarding the alarm acknowledgement upstream to the AGE; means for sending downstream to all SME's interested in the alarm an alarm notification that an alarm acknowledgement has been sent; means for receiving an alarm notification and determining whether the alarm notification is new; means for recording the alarm notification if it is new and discarding the alarm notification if it is not new; and means for sending an alarm notification downstream to all SME's interested in the alarm.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

For the purposes of the following explanation, it will be assumed that a network and its peripherals includes three different types of components, namely AGE's (alarm generating entities), SME's (surveillance management entities) and SME-UI's (surveillance management entities equipped with user interfaces). AGE's are any entities within or peripheral to the network capable of generating alarms. An SME is any entity within or peripheral to the network that generates, maintains, or forwards alarm information. An SME-UI is a type of SME which includes a display for visually presenting network alarm information to an operator forming part of the network management personnel, and is capable of generating alarm acknowledgements.

Furthermore, this invention is not concerned with the mechanism by which an alarm is sent to a SME-UI from an AGE. However, for the purposes of explanation, it is assumed that when an AGE generates an alarm it is sent to a set of relevant SME-UI's which receive the alarm. The invention is concerned with how a particular one of the relevant SME's or SME-UI's can acknowledge the alarm such that the entire system knows the alarm acknowledgement state of the system, and redundant acknowledgements are not generated.

It is assumed that each alarm has a unique recordable identifier which is generated when the alarm is created. As the alarm is initially passed from the relevant AGE to all SME's and SME-UI's interested in the alarm, each SME and SME-UI records the unique recordable identifier for the alarm.

Figure 1:
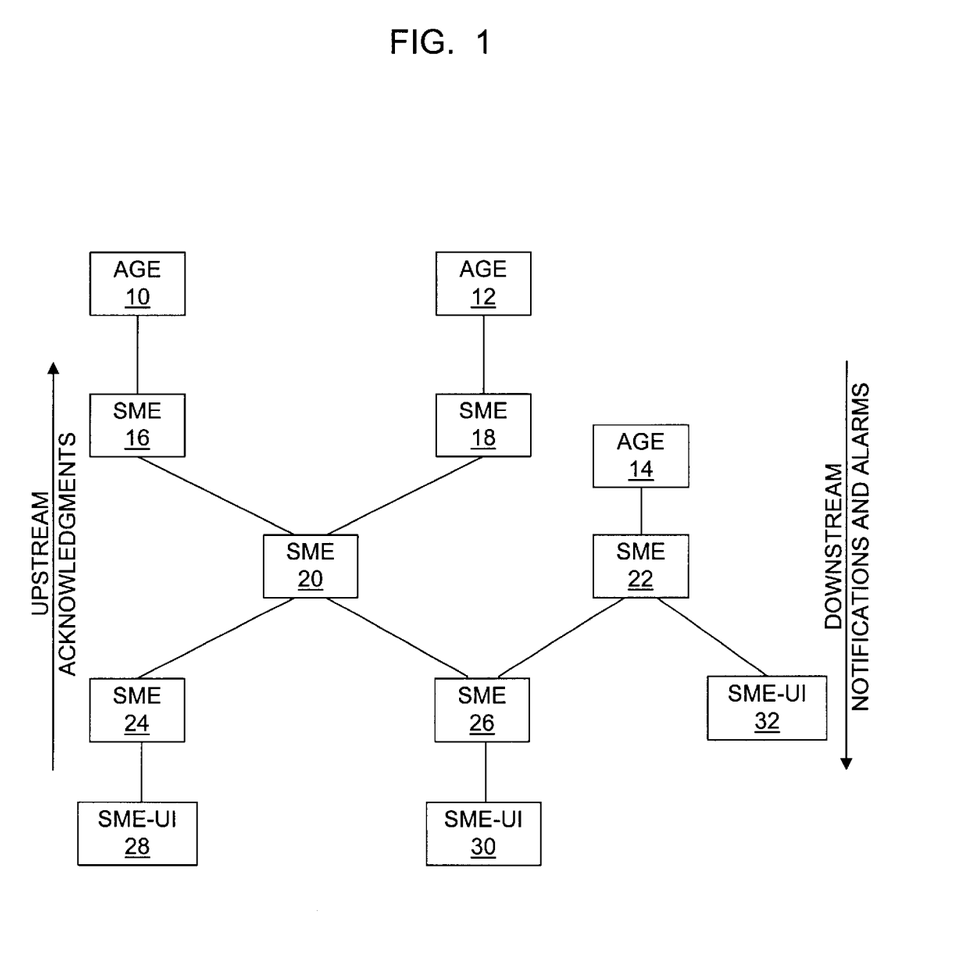
FIG. 1 is a block diagram of a sample network according to an embodiment of the invention.

An example system is illustrated in FIG. 1 and includes several AGE's 10,12,14 several SME's 16,18,20,22,24,26 and several SME-UI's 28,30,32. Several further definitions are required to facilitate the further explanation of this embodiment of the invention.

Alarm: a message which is generated by an AGE indicating the fact that an alarm condition has arisen. The AGE generates the unique recordable identifier and includes this in the alarm;

Alarm acknowledgement: a message that is generated when an operator acknowledges an alarm; this message includes the identifier of the relevant alarm and a timestamp indicating when the alarm acknowledgement was first generated;

Alarm notification: a message that is generated to indicate that an alarm has been acknowledged; this message includes the identifier of the relevant alarm and a timestamp indicating when the related alarm acknowledgement was first generated;

Upstream: In the direction towards the AGE's. An upstream path is a path taken in the upstream direction by an alarm acknowledgement from a SME-UI to an AGE. There is a unique upstream path for each SME-UI/AGE pair. For example, for an alarm generated by AGE 10 which is acknowledged by SME-UI 28, the upstream path consists of SME 24, SME 20, SME 16 and finally AGE 10. The upstream path for a particular SME-UI AGE pair is simply the reverse of the path by which the alarm generated by the AGE made it to the SME-UI.

Downstream: In the direction away from AGE's. A downstream path is a path taken by the original alarm and an alarm notification (notifications are discussed in detail below). There may be many downstream paths emanating from a single AGE, and therefore downstream can be in many directions, like tributaries of a river delta. For example for AGE 10 a first downstream path may consist of SME 16, SME 20, SME 24, and SME-UI 28, and a second downstream path may consist of SME 16, SME 20, SME 26, and SME-UI 30.

Source: For a specific SME, the "source" is the SME to which alarm acknowledgements are passed relating to a particular AGE. For example, in FIG. 1, alarm acknowledgements received by SME 20 relating to AGE 10 are passed to source SME 16. For each AGE, a given SME has only a single source.

Sink: For a specific SME, the "sinks" for a specific AGE are the SME's to which the specific SME sends notifications. For example, in FIG. 1, SME 20 may send notifications relating to AGE 10 to sink SME 24 and sink SME 26. For each AGE, a given SME may have many sinks.

An alarm acknowledgement state machine is used to manage the state of the acknowledgement of each alarm at each SME. Each SME or SME-UI interested in a particular alarm records the alarm acknowledgement state in association with the alarm identifier. For the purposes of illustration, a very simple alarm acknowledgement state machine will be described. The state machine is shown diagrammatically in FIG. 2 and includes two states, namely "Unacknowledged" and "Acknowledged" and a single state transition, namely that from Unacknowledged to Acknowledged. When an SME or SME-UI is initially informed of an alarm (with an alarm message) the alarm acknowledgement state for the alarm is initialized to Unacknowledged. The alarm acknowledgement state remains Unacknowledged until an acknowledgement message is received at which time it switches over to Acknowledged.

Figure 2:
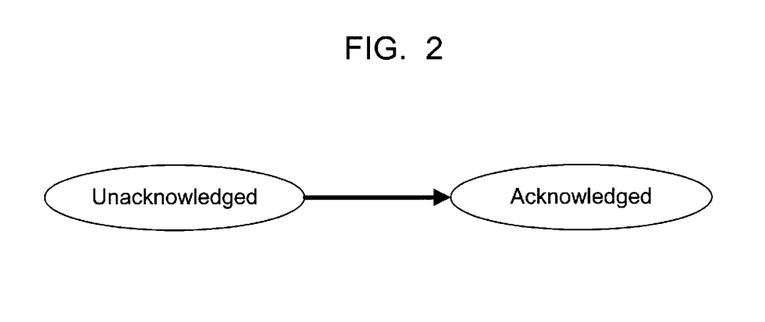
FIG. 2 is a simple alarm acknowledgement state machine for use in the network of FIG. 1.

This simple state machine permits the resolution of which of two SME's have correct alarm information for a particular alarm. For example if one SME thinks that an alarm is Unacknowledged and another SME thinks that it is Acknowledged, then the one that thinks it is Acknowledged is correct and will update the other. If both SME's think the alarm is Acknowledged but with different timestamps, the SME with the earlier timestamp is correct and will update the other. This assumes that all of the times on the SME's are set correctly and kept in synch.

Normal Mode of Operation

An alarm acknowledgement initiates when an operator at a particular SME-UI acknowledges an alarm from a particular AGE. The alarm acknowledgement is passed upstream along the unique upstream path from that SME-UI to the particular AGE. For example, in FIG. 1, if SME-UI 28 is acknowledging an alarm from AGE 10, the alarm acknowledgement passes along the upstream path consisting of SME 24, SME 20 and SME 16 on its way back to AGE 10.

When an SME receives an alarm acknowledgement, it checks to see if the alarm has already been acknowledged. It does this by examining the alarm acknowledgement state of the alarm identified in the acknowledgement. An alarm acknowledgement for an alarm which has yet to be acknowledged at that SME is a "correct" acknowledgement. If the alarm acknowledgement state is Acknowledged then there will be a previously recorded timestamp, and the SME must have previously received an alarm acknowledgement message or a notification of another alarm acknowledgement. If this is the case, a resolution of which alarm acknowledgement was first must be performed, the first acknowledgement also being a "correct" acknowledgement. This may be done by comparing the time stamp of the newly received alarm acknowledgement with the previously recorded timestamp. The earlier of the two timestamps determines which of the two is "correct". An alarm acknowledgement which is not "correct" is "incorrect". If the newly received alarm acknowledgement is determined to be correct, then the SME records the information in the acknowledgement by recording state of the alarm acknowledgement to be Acknowledged and by recording the timestamp received in the Acknowledgement message. It forwards the alarm acknowledgement upstream to the relevant source SME and then generates and sends a notification downstream to each downstream SME interested in receiving alarm information about the particular AGE which generated the particular alarm. A definition as to whether or not a downstream SME is interested in a particular type of alarm must be made available to the SME sending the notification. A particular downstream SME might be interested in alarms relating to specific AGE's for example, or alternatively might be interested in any alarms of a specific type relating to any AGE. This information might be stored locally on each SME for example, or in a repository. In the above example, when SME 20 receives the alarm acknowledgement, and it knows that both SME 24 and SME 26 are interested in alarms relating to AGE 10, it sends a notification to each of SME 24 and SME 26.

When an SME receives a notification, it checks to see if it already knows about the notification. It does this by examining the alarm acknowledgement state of the alarm identified in the notification. If the alarm acknowledgement state is Acknowledged then there will be a previously recorded timestamp associated with that alarm. The SME then compares the timestamp of the newly received notification with the previously recorded timestamp. If the timestamps are the same, then the SME simply ignores the newly received notification. If the newly received notification has a later timestamp then it also ignores the newly received notification. If the newly received notification has an earlier timestamp, then the SME records the newly received notification information by recording the timestamp received in the notification and sends the notification downstream to any SME's downstream of that SME which are interested in alarm information relating to the particular AGE. Both a newly received notification relating to an alarm with an unacknowledged state, and a newly received notification having an earlier timestamp will be referred to as a "new notification". A newly received alarm notification which is not a "new notification" is either an "old notification" in the case that the previously recorded timestamp is the same as that in the newly received notification, or an "incorrect notification" in the case that the previously recorded timestamp is earlier than that in the newly received notification.

Both incorrect acknowledgements and incorrect notifications are eliminated over time as the correct acknowledgements and notifications are propagated, compared with the incorrect ones, and used to replace the incorrect ones.

Every SME implements the same method consisting of:
In response to an alarm acknowledgement:
1) determining whether or not the alarm acknowledgement is a correct acknowledgement;
2) recording the alarm acknowledgement if it is a correct acknowledgement and otherwise discarding the acknowledgement;
3) if it is a correct acknowledgement, forwarding the alarm acknowledgement upstream to the single SME in the upstream direction or in the case of the SME being the last SME forwarding the alarm acknowledgement upstream to the AGE;
4) if it is a correct acknowledgement, sending downstream to all SME's interested in the alarm an alarm notification that an alarm acknowledgement has been sent; in response to receiving an alarm notification:
5) determining whether the alarm notification is a new notification;
6) if the notification is a new notification, recording the alarm notification and discarding the alarm notification if it is not new; and
7) if the notification is a new notification, sending an alarm notification downstream to all SME's i nterested in the alarm.

EXAMPLES

Figure 3:
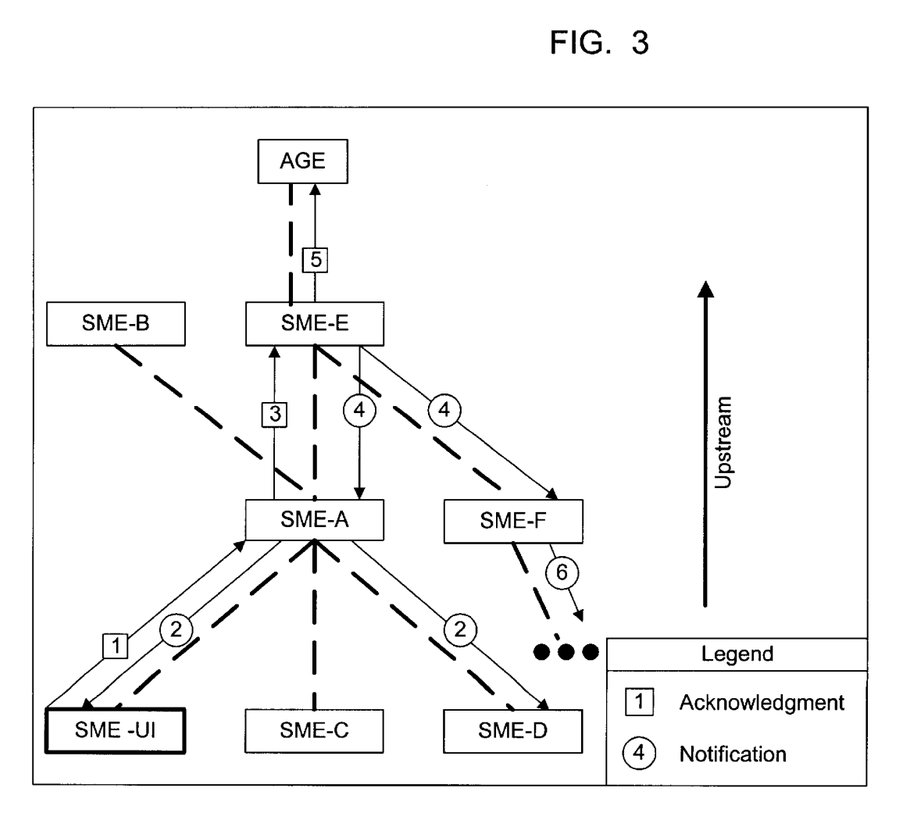
FIG. 3 is an example of alarm acknowledgement ID messaging according to an embodiment of the invention.

Referring now to FIG. 3, a non-failure mode example of the alarm acknowledgement method will be described. In this example, there is a single SME-UI, and a single AGE, and six other SME'S, namely SME-A, SME-B, SME-C, SME-D, SME-E and SME-F. Acknowledgement messages are illustrated by arrows with numbered squares on them while notification messages are illustrated by arrows with numbered circles on them. In the following sequence of steps, the numbers in brackets identify acknowledgement messages according to the numbered squares and notification messages according to the numbered circles.

1. An operator using the SME-UI acknowledges an alarm.

2. The SME-UI generates an acknowledgement message (1) and sends the message upstream to its source SME, SME-A.

3. SME-A receives the acknowledgement message and records the information. It then generates notification message (2) and sends this to every dependent SME which is interested in knowing whether this alarm was acknowledged. In this example, a notification message (2) is set to SME-UI and SME-D.

4. SME-A then forwards acknowledgement message (3) upstream to SME-E which is the source of alarms for the AGE the alarm belongs to.

5. SME-UI receives the notification message (2) and updates the UI by changing the state of the alarm acknowledgement to indicate Acknowledged.

6. SME-D receives the notification message (2) and records this.

7. SME-E receives acknowledgement message (3) and records the information. It then generates a notification message (4) and sends it to every dependent SME that is interested in knowing whether the alarm was acknowledged. In this example, a notification message (4) is sent to SME-A and SME-F.

8. SME-E forwards the alarm acknowledgement message (5) upstream to the AGE.

9. SME-A receives notification message (4) and detects that it already knows the information in the message so it ignores the message.

10. SME-F receives the notification message (4)and records the information. It then forwards a notification message (6) to every dependent SME that is interested in knowing whether this alarm was acknowledged.

Notes for this example: SME-B was not involved in this scenario because it is not an SME for the AGE that the alarm belonged to. SME-C was not involved in this scenario because it is not interested in alarms for the AGE that the alarm belonged to.

Now several problem scenario examples will be described which the above-described alarm acknowledgement method inherently handles.

Problem Scenario 1: An alarm is acknowledged on the downstream side of a communications failure.

Problem Description: for whatever reason a local SME cannot forward an Acknowledgement upstream to the relevant Source SME.

Solution: When connectivity is re-established with the Source SME the local SME will synchronize its view of the world with that of the Source SME. During the synchronization, the local SME will detect that the Source SME has an Unacknowledged state for the alarm at which point the local SME will recreate the Alarm Acknowledgment message from its own data and send it to the Source SME.

This "recreated" acknowledgment can be generated minutes, hours, days, anytime after the acknowledgment actually occurred. The time in the acknowledgment thus generated will be the time the original acknowledgment was generated, not the current time.

Problem Scenario 2: An alarm is acknowledged on the upstream side of a communication failure.

Problem Description: For whatever reason the local SME cannot send a Notification message downstream to a Sink SME.

Solution: When connectivity is re-established, the Sink SME will synchronize itself with the local SME. The Sink will detect that the local SME has an acknowledgment for the alarm and this information will be sent to the Sink SME, the Sink SME will treat this as an alarm notification from the Source SME and generate the appropriate alarm notification and alarm.

These "recreated" acknowledgments or notifications can be generated minutes, hours, days, anytime after the acknowledgment actually occurred. The time in the message thus generated will be the time the original acknowledgment was generated, not the current time.

Problem Scenario 3: Two clients acknowledge the same alarm at almost the same time Problem Description: A SME-UI in one part of the system acknowledges an alarm, and another SME-UI in another part of the system also acknowledges the same alarm before it has received the notification that the alarm was acknowledged elsewhere. Now there are two acknowledgments for the same alarm.

Solution: The "correct acknowledgement", or "winner" is determined by applying the state resolution algorithm previously. If an SME receives a second acknowledgment for the same alarm it always applies the algorithm. If it finds that the second message is not the winner then it ignores the message. If it finds that the second message is the winner then it has to update its records and then it has to notify everyone it can that it has discovered the discrepancy. It does this by simply generating an Acknowledgment and Notification as necessary.

Problem Scenario 4: Communication problems result in two separate acknowledgments of the same alarm Problem Description: A communication failure results in two SME's changing the acknowledgment state of the alarm at different times. A communications problem results in a split in the management system for a significant duration. During the interval, the exact same alarm has its acknowledgment state changed by an SME downstream of the communications failure and also by an SME that is connected to the upstream side of the failure. This results in two different stories describing the history of the alarm.

Solution: When communication is restored, the SME on the downstream side of the failure is responsible for synching its view of the world with its Source(s) (the SME(s)) on the upstream side of the failure. At this time each alarm is checked to determine which SME has the correct picture (using the appropriate algorithm as mentioned previously) and this is propagated to the rest of the system.

If the acknowledgement at the downstream SME is correct then the solution from Scenario 1 applies. i.e. the downstream SME will regenerate the alarm acknowledgment message and send it to the upstream SME.

If the acknowledgment from the upstream SME is correct then the solution from Scenario 2 applies. i.e. the downstream SME treats the alarm acknowledgement information from the upstream SME as an alarm notification and generates the appropriate alarm notification and alarm acknowledgement messages as required.

As a specific example of this problem scenario referring again to FIG. 1, the following sequence of events may occur:

1 pm: The connection between SME 20 and SME 26 fails 2 pm: A user at SME-UI 28 acknowledges an alarm raised by AGE 10

3 pm: A user at SME-UI 30 acknowledges the same alarm raised by AGE 10 Notice that because of the failure in the communication paths between SME 20 and SME 26 SME-UI 30 does not know the alarm has already been acknowledged. At this time there are two different acknowledgments for the same alarm in the two, isolated, portions of the system.

4 pm: The connection between SME 20 and SME 26 is restored.

SME 26 will now synchronize its view of the alarms from AGE 10 with SME 20. At this time it will discover the discrepancy and is resolved as described in scenario 4.

Problem Scenario 5: SME dies

Problem Description: An SME dies and forgets the alarm acknowledgment state of the alarms it is maintaining.

Solution: When this SME is resurrected it will synchronize itself with its source(s). The sources will have maintained the alarm acknowledgment information and will send it in the alarm information. When the Sinks for which this SME is the source synchronize themselves with this SME, they will notify this SME of any alarms that were acknowledged while this SME was down because they will detect the different alarm acknowledgment information for the alarm and regenerate the alarm acknowledgment message as needed.

In the end case where this SME is the furthest SME upstream that manages alarm acknowledgment information then it will be up to the Sinks to regenerate the appropriate alarm acknowledgment messages.

Optimization

This description has not addressed optimizations that are possible to reduce message size or the number of messages. However, it will list a few of the many possible areas for optimization.

Bounce Back

When an SME generates an alarm acknowledgment and sends it upstream, it may or may not want to receive the notification back. For example, an SME may typically not want the notification back because they would have to perform ark checks to determine whether they needed to apply it or toss it. On the other hand, UIs may want to get the notification back because they would use it as a confirmation that the alarm was actually acknowledged by the system. In fact the UI may not update the screen until it received the notification.

Synchronizing Upstream

When synchronizing with an upstream source it may be prudent to only request the information necessary to detect differences in the sets of alarms and then only request the full details of the alarms that are missing as opposed to the brute force method of providing all alarm information.

Interesting Points

If every SME supports alarm acknowledgment then true global acknowledgment will result. Regardless of where the user is who acknowledges an alarm, everyone monitoring the alarm will be notified.

This model has some interesting side-effects. If an SME or AGE does not support alarm acknowledgment it does not prevent the rest to the SMEs from providing alarm acknowledgment to the best of their ability.

A quick response time for the user is maintained because the notification is reflected back downstream by every SME. This eliminates the long delay that could have resulted if we followed the model where the notification was reflected only at the SME or AGE furthest upstream capable of supporting alarm acknowledgment.

Alarm acknowledgment works even when there is a failure in the SME upstream.

Persistency is maintained without permanent store as the entire system maintains the alarm acknowledgment information. Advantageously, since alarm information is maintained in a distributed manner, a non-volatile storage mechanism for the alarms is not required. Instead, the alarm information may be managed on each SME in a volatile storage mechanism such as RAM for example. Despite this volatile storage mechanism, the required degree of alarm information survivability still exists. Because the alarm information is distributed, if one SME's RAM becomes corrupt, it can refer to the other SME's to recover the lost information. Only if all of the SME's holding information regarding a particular AGE failed simultaneously would any information be permanently lost. More specifically, every single SME interested in an Alarm would have to die, virtually simultaneously for the alarm acknowledgment for that alarm to be lost. This is an extreme failure scenario. If this is an issue then only one of the SME's needs to implements a permanent store mechanism to provide 100% persistence of alarm acknowledgment.

Logging

There are a number of options for logging alarm acknowledgments, they each have advantages and disadvantages. The options include logging at source, logging everywhere, and log as soon as possible (ASAP).

Log as soon as possible means the SME that first receives the alarm acknowledgment and is capable of logging the acknowledgment will do so and flag the acknowledgment as logged so that other SMEs do not log it as well. This flag is simply advisory in nature and does not prevent other SMEs from also logging the acknowledgment if they are configured to do so.

The advantages of logging as soon as possible are:
acknowledgments are only logged once in the system so as to conserve resources;
the algorithm is simple, if it is not flagged as already logged, log it and flag it before forwarding it to other SMEs;
if an SME is incapable of logging the acknowledgment, it knows that if another SME is capable it will eventually get the acknowledgment and log it.
The disadvantages of logging as soon as possible are:
logs from every SME have to be collected and merged to build an accurate picture of what has happened;
SMEs will have to be configured so that they do not become a bottleneck for processing because they may be disk-bound logging the acknowledgments.

Log everywhere means every SME that is capable of logging acknowledgments will do so. An advantage of logging everywhere is that a picture of what has happened is available from a single location. A disadvantage of logging everywhere is that this consumes a lot of resources. Both disk space and CPU cycles are consumed logging every acknowledgment.

A hybrid solution may be implemented where different and often conflicting requirements can be satisfied. The hybrid solution is based on the ASAP implementation, where each SME that can log can additionally be configured to:
not flag the acknowledgment as logged when it is logged (upstream, downstream, or both);
log acknowledgments, even those that are already flagged as logged.

This description does not attempt to detail the contents of the alarm acknowledgment information other than it assumes there is a time stamp associated with it and some sort of alarm identifier.

The time stamp would be the time at which the alarm acknowledgment is generated. It could be set to 0 by an SME-UI so that the network fills it in. This is useful in the situation where the SME-UI computer does not maintain an accurate enough internal clock to satisfy integrity of the alarm acknowledgment system. This may be especially useful if the SME-UI computer is not secure and allows the user to freely set the clock on the computer.

Acknowledgement information could also include a string that would uniquely define the user who acknowledged the alarm. This string might be of any length and is basically free-format.

Optionally the system could be configured to allow users to generate additional text that is kept with the acknowledgment.

Performance Consideration

Obviously there are situations where performance could be impacted depending on the nature of the alarms, bursty or toggling alarm scenarios, or when many alarms are acknowledged at the same time. There are a number of designs that could alleviate some of these potential performance bottlenecks.

If numerous alarms are acknowledged at almost the same time, the acknowledgments can be combined into a single message thus eliminating the additional overhead of multiple message headers.

Figure 7:
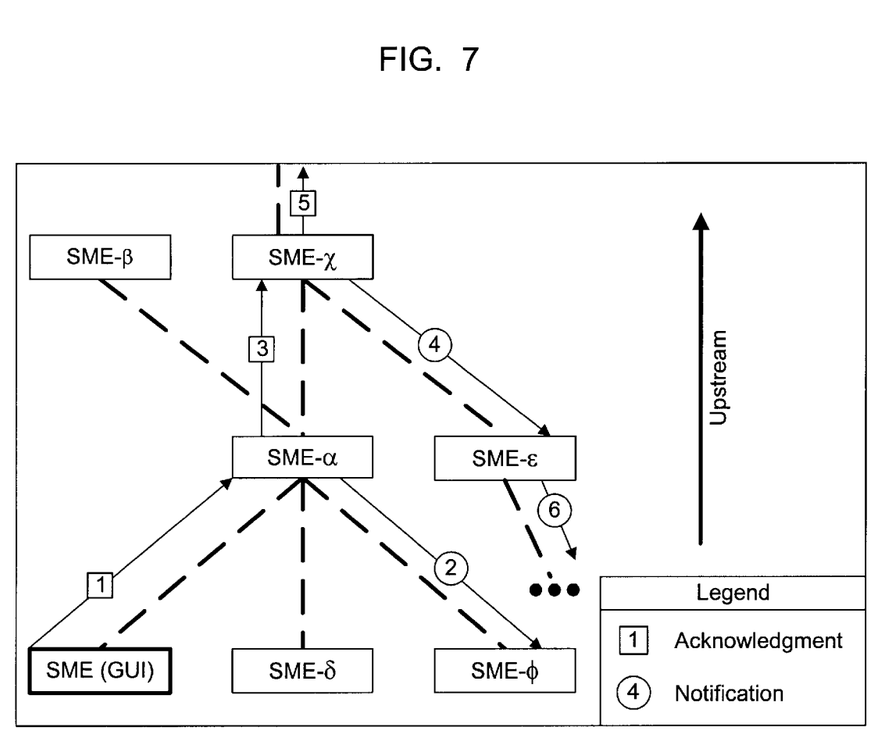
FIG. 7 is an example of alarm acknowledgement messaging with smart reflection.

A portion of the messages could be eliminated by making the forwarding of the acknowledgments not be sent to the SME that sent the message to the SME. An example of this is illustrated in FIG. 7.

The disadvantage of this design is that it adds extra complexity to the SME as it has to some how figure out or remember where the acknowledgment came from so that the Notification is not sent there. The advantage of this design is an SME that receives a Notification no longer has to check to see it already had the information and make a decision, it gets a Notification it simply applies it and sends it downstream.

The alarm acknowledgment messages could be given a lower priority so that they do not impact the primary function of reporting new alarms in the network. Thus the sending of Acknowledgments or Notifications could be deferred until there is a lull in the alarm stream. This could reduce the impact alarm acknowledgments may have on the alarm stream.

Numerous modifications and variations of the present invention are possible in light of the above teachings. It is therefore to be understood that within the scope of the appended claims, the invention may be practised otherwise than as specifically described herein.

In the illustrated embodiments, the SME's are arranged in a hierarchical fashion. In some situations, SME's may be peers instead. As peers, depending on the AGE, an SME may be the sink for another SME, but the source for the same SME for a different AGE. In this case, the roles that a pair of SME's play depends upon which SME is being considered.

Figure 4:
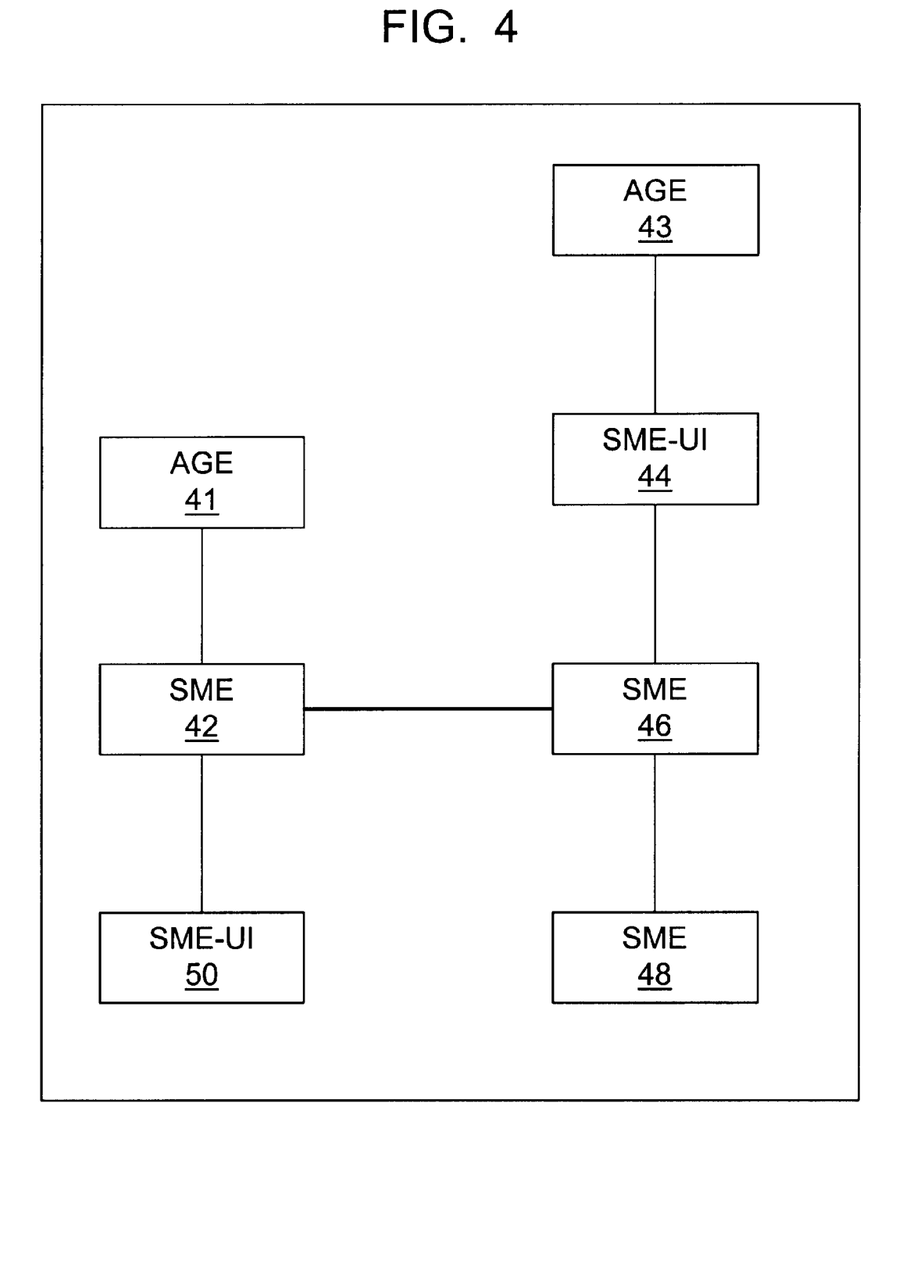
FIGS. 4–6 are examples of alarm acknowledgement messaging with peer surveillance management entities.

An example of this is depicted in FIG. 4. In this Figure, SME 42 and SME 46 are peer SME's. For alarms originating at AGE 41, SME 42 is the Source and SME 46 is the Sink. At the same time, for alarms originating at AGE 43, SME 46 is the Source and SME 42 is the Sink. This makes SME 42 upstream of SME 46 with respect to alarms originating at AGE 41, and at the same time downstream of SME 46 with respect to alarms from AGE 43. Thus it is important to make it clear which AGE is involved when referring to peer SME's.

For example, the upstream path from SME-UI to AGE 43 is: SME-UI 50, SME 42, SME 46, SME 44, and finally AGE 43. The upstream path from SME 48 to AGE 43 is SME 48, SME 46, SME 44, and AGE 43. The upstream path for from SME 48 to AGE 41 is SME 48, SME 46, SME 42 and finally AGE 41. Lastly, the upstream path from SME-UI 50 to AGE 41 is SME-UI 50, SME 42 and AGE 41.

Figure 5:
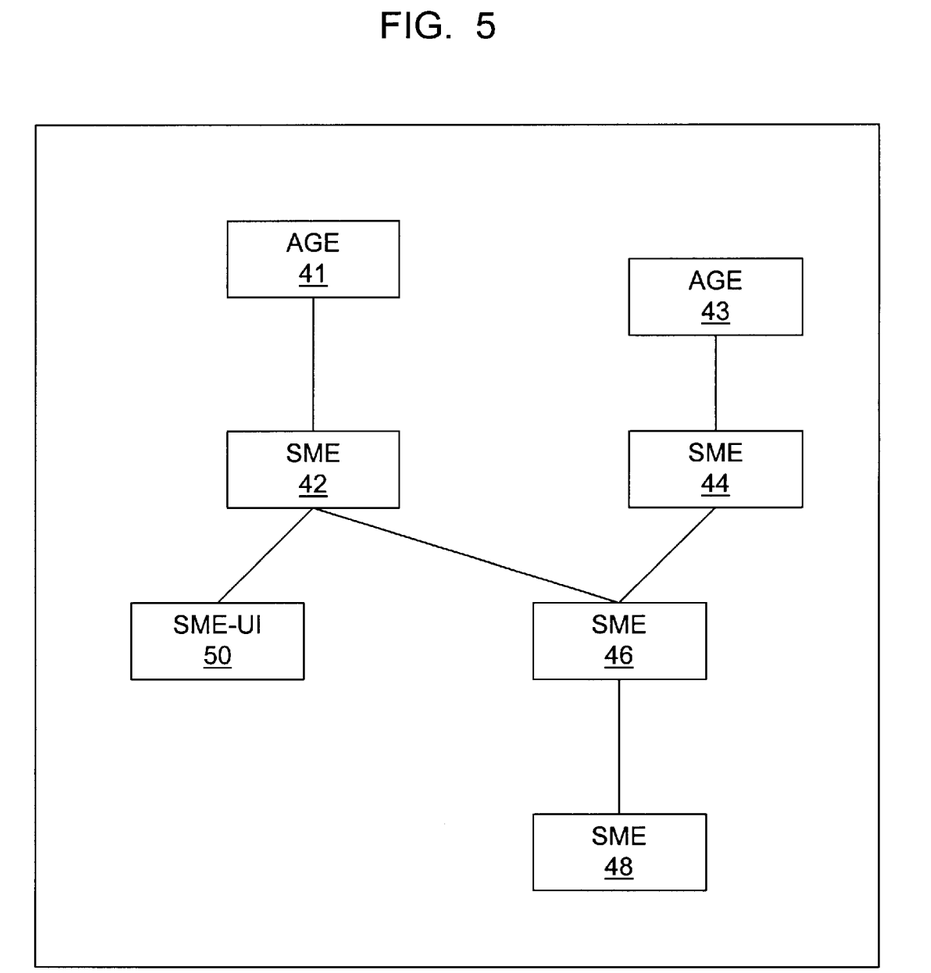
Figure 6:
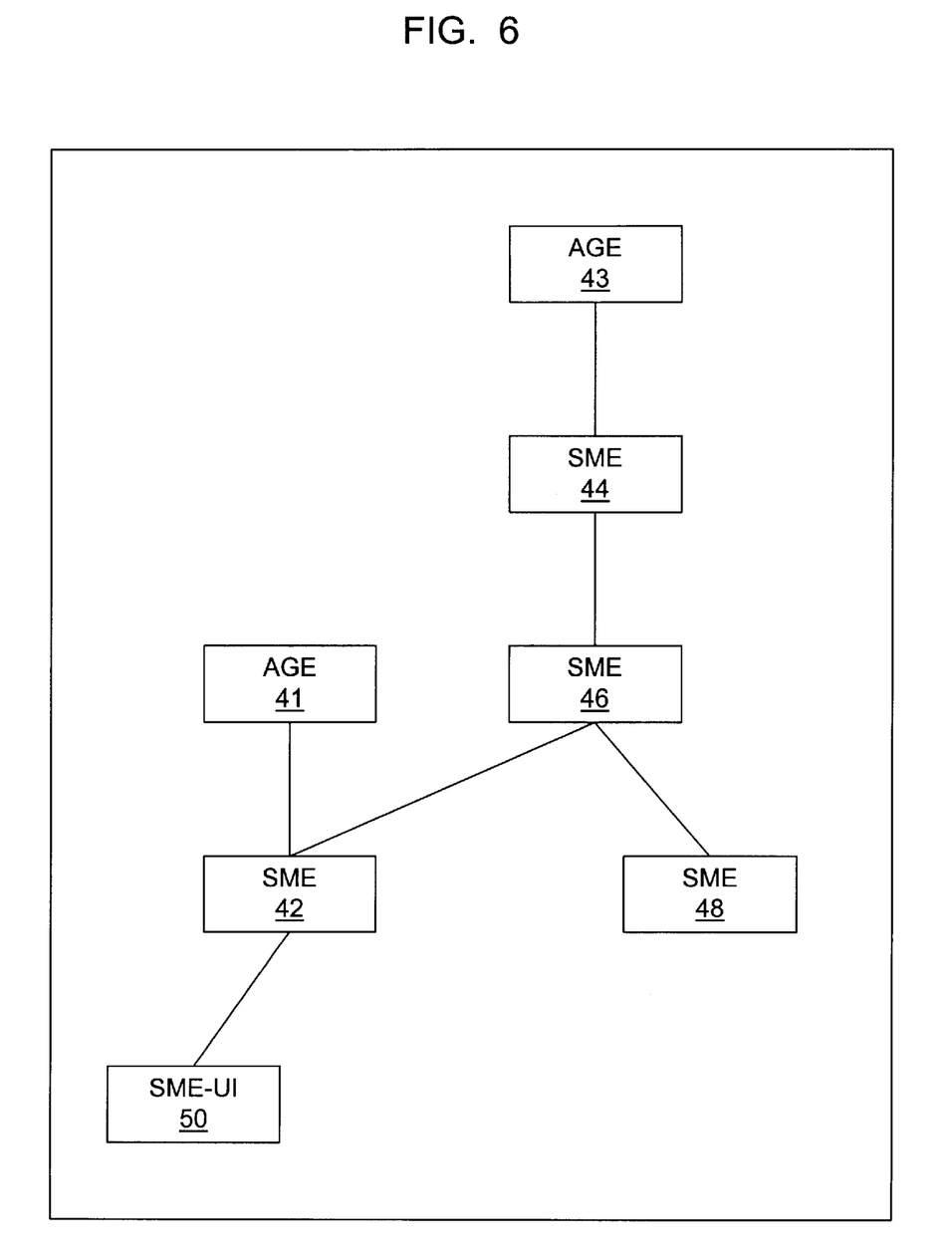

For the purpose of clarification, it is possible to redraw the network of SME's depending on the AGE of interest. In FIG. 5, the network has redrawn where AGE 41 is of interest, and in FIG. 6, the network is redrawn where AGE 43 is of interest. When a particular AGE is singled out, the hierarchical arrangement of the SME's for that AGE becomes apparent. In FIG. 5, SME 42 is shown to be upstream of SME 46 in contrast to FIG. 6 where the reverse is true.

In the illustrated example, SME-UI's are the source of alarm acknowledgements. However, the network may be connected to higher level management systems which are capable of generating these acknowledgements, but which may or may not be equipped with a user interface. In the context of this description, any system element which has any management capability has been defined to be an SME. Thus, in some cases alarm acknowledgements may come from SME's rather than from SME-UI's.

SME's, SME-UI's and AGE's are all connected together with links in some fashion to form a network. Each of these entities has interfaces to the links in the network for receiving and transmitting alarm information. The substance of these links and interfaces is not important to the invention, suffice it to say that there are many known mechanisms for connecting entities through links so as to allow messaging communications over the links between the entities.

The embodiments of the invention in which an exclusive property or privilege is claimed are defined as follows:

1. In a network comprising a plurality of AGE's (alarm generating entity) which generates alarms and a plurality of interconnected SME's (surveillance management entities) each AGE in direct communication with a respective one of the SME's, for each {SME,AGE} pair a direction of communication towards the AGE being defined as upstream for that {SME,AGE} pair and a direction of communication away from the AGE being defined as downstream for that {SME,AGE} pair, a method of acknowledging alarms comprising the steps of in respect of each alarm generated by a respective AGE:

a) a particular SME generating an alarm acknowledgement to the alarm and passing this to a single SME upstream for the {particular SME, respective AGE} pair;

b) in respect of each alarm acknowledgement to the alarm received by an SME, the SME preforming the steps of:
   recording the alarm acknowledgement;
   forwarding the alarm acknowledgement upstream to a single SME upstream for the {SME, respective AGE} pair unless the SME is the SME in direct communication with the respective AGE in which case forwarding the alarm acknowledgement upstream to the respective AGE;
   sending to all SME's which are downstream for the {SME, respective AGE }pair which are interested in the alarm an alarm notification that an alarm acknowledgement has been sent;

c) in response to receiving an alarm notification received by an SME:
   the SME recording the alarm notification; and
   the SME sending an alarm notification to all SME's which are downstream for the {SME, respective AGE} pair which are interested in the alarm.

2. A method according to claim 1 wherein each alarm has a unique alarm identifier, and each alarm acknowledgement and notification includes the alarm identifier of the alarm the acknowledgement or notification relates to.

3. A method according to claim 2 further comprising the step of each SME recording the alarm identifier of all alarms it receives.

4. A method according to claim 3 further comprising in respect of each alarm generated by a respective AGE:
   the particular SME including in the alarm acknowledgement a timestamp indicating when the alarm acknowledgement was generated.

5. A method according to claim 4 wherein each notification includes the timestamp of the alarm acknowledgement from which it was originally generated.

6. A method according to claim 5 wherein the step of recording the acknowledgement comprises recording an "Acknowledged" state and the timestamp in association with the alarm identifier.

7. A method according to claim 6 wherein the step of recording a notification comprises recording an "Acknowledged" state and the time stamp in association with the alarm identifier.

8. A method according to claim 7 further comprising the steps of:
   in respect of each alarm acknowledgement to the alarm received by an SME:
   in response to receiving the alarm acknowledgement, before performing the three steps of recording the acknowledgement, forwarding the alarm acknowledgement and sending the notification(s), determining whether the alarm acknowledgement is correct, and if not discarding the alarm acknowledgement without performing the three steps.

9. A method according to claim 7 further comprising the steps of:
   in response to receiving an alarm notification received by an SME, before the two steps of recording the alarm notification and sending alarm notification(s) determining whether the alarm notification is new, and if not discarding the alarm notification without performing the two steps.

10. A method according to claim 8 wherein determining whether the alarm acknowledgement is correct comprises determining whether there exists a timestamp previously recorded in association with the relevant alarm identifier which is earlier than that in the alarm acknowledgement, and if not concluding the alarm acknowledgement is correct.

11. A method according to claim 9 wherein determining whether an alarm notification is new comprises determining whether there exists a timestamp previously recorded in association with the relevant alarm identifier which is earlier than that in the alarm notification, and if not concluding the alarm notification is new.

12. A method according to claim 1 wherein the particular SME has a user interface, the method further comprising the steps of:

the particular SME accepting through the user interface an acknowledgement command from an operator, and generating said alarm acknowledgement.

13. A method according to claim 1 wherein a plurality of said SME's have user interfaces, the method further comprising the step of:

each SME with a UI updating a display on the UI when an alarm notification is received to indicate that the alarm has been acknowledged.

14. A method according to claim 1 further comprising the steps of:

when an upstream SME is temporarily unreachable from a downstream SME, after connectivity is reestablished the upstream and downstream SME's aligning their view of each alarm they are both interested in by:

if the downstream SME indicates the alarm is acknowledged and the upstream SME does not, the downstream SME sending an acknowledgement message to the to the upstream SME.

15. A method according to claim 1 further comprising the steps of:

when a downstream SME is temporarily unreachable from an upstream SME, after connectivity is reestablished the upstream and downstream SME's coordinating their view of each alarm they are both interested in by:

if the upstream SME indicates the alarm is acknowledged and the downstream SME does not, the upstream SME sending a notification message to the downstream SME.

16. A method according to claim 15 wherein if two such acknowledgement commands are entered by two operators at two different SME's resulting in two acknowledgement messages for the same alarm, the following steps are performed:

any SME which receives the two acknowledgement messages for the same alarm determining which acknowledgement was generated first;

if the acknowledgement which was generated first was also received first by said any SME, said any SME ignoring the second acknowledgement;

if the acknowledgement which was generated first was received second by said any SME, said any SME updating its own records and notifying every SME that it can that it has discovered the discrepancy.

17. A method according to claim 1 wherein a notification message is not sent to an SME which generated an alarm acknowledgement.

18. A method according to claim 1 wherein the recorded alarm acknowledgements and notifications are maintained in a volatile store.

19. An SME (surveillance management entity) for use in a network comprising a plurality of AGE's (alarm generating entity) which generate alarms and an interconnected plurality of such SME's, including each AGE in direct communication with a respective one of the SME's, for each {SME,AGE} pair a direction of communication towards the AGE being defined as upstream for that {SME,AGE} pair and a direction of communication away from the AGE being defined as downstream for that {SME,AGE} pair, the SME comprising:

means for generating an alarm acknowledgement in response to an alarm received from a respective AGE and passing this upstream;

means for receiving and recording an alarm acknowledgement in respect of a particular alarm adapted to; forward the alarm acknowledgement upstream to a single SME in the upstream direction for the {SME,AGE which generated the alarm} pair or in the case of the SME being the SME in direct communication with the AGE which generated the alarm forward the alarm acknowledgement upstream to the AGE, and send downstream to all SME's interested in the particular alarm an alarm notification that an alarm acknowledgement has been sent;

means for processing an alarm notification in respect of a particular alarm adapted to determine whether the alarm notification is new, record the alarm notification if it is new and discard the alarm notification if it is not new, and send the alarm notification downstream to all SME's interested in the alarm.

20. An SME according to claim 19 wherein the means for recording the alarm acknowledgement and the means for recording the alarm notification comprise a volatile store.

21. An SME according to claim 19 further comprising a user interface for displaying alarms and alarm notifications indicating that alarms have been acknowledged.

* * * * *